(No Model.)

P. S. RYAN.
MILK COOLER.

No. 430,545. Patented June 17, 1890.

Witnesses—
Walter P. Keene
F. L. Middleton

Inventor:
Patrick S. Ryan,
By Ellis Spear
Attorney.

UNITED STATES PATENT OFFICE.

PATRICK S. RYAN, OF RUTLAND, VERMONT.

MILK-COOLER.

SPECIFICATION forming part of Letters Patent No. 430,545, dated June 17, 1890.

Application filed February 25, 1890. Serial No. 341,657. (No model.)

*To all whom it may concern:*

Be it known that I, PATRICK S. RYAN, of Rutland, in the county of Rutland and State of Vermont, have invented a new and useful Improvement in Milk-Aerators; and I do hereby declare that the following is a full, clear, and exact description of the same.

My invention relates to the cooling and aeration of milk, and has for its object the removal of all animal heat and odor from the milk by exposing it to the air as the milk is poured into the cans in which it is to be transported to the place of use. Especially is my invention desirable in cooling milk which is to be used in creameries or cheese-factories.

My invention consists of a cooling-plate having brackets extending from its edges to engage with the rim of the can-mouth, so that the plate will be within the mouth, and will extend to near the can-sides.

Figure 1:
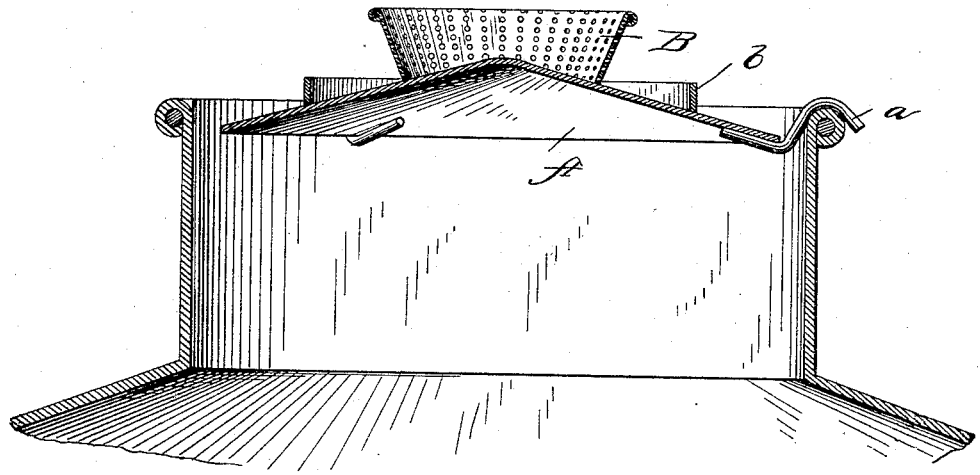
Figure 2:
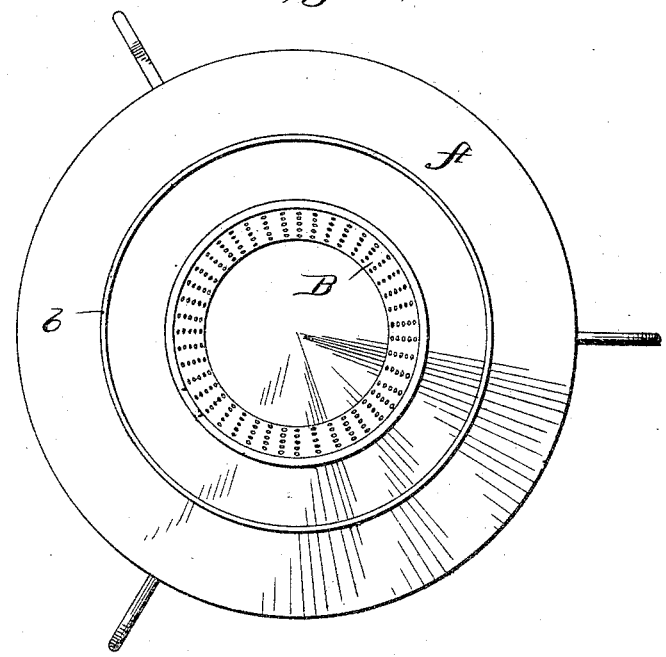

In the accompanying drawings, Figure 1 is a sectional view of the invention as applied to a milk-can. Fig. 2 is a plan view.

The cans may be of any ordinary construction, such as are used for transporting milk, and my improved cooling device is adapted to be suspended within the mouth of the can by supporting-brackets $a$, which extend upwardly to engage the rim of the can, and which are suitably connected to the cooling-surface. This cooling-surface is approximately cone-shaped, though it may be flat, and is composed, preferably, of metal, being of circular form in plan, and of such size as to fit within the can, so as to cause the milk as it flows over its surface to run down the sides of the can, this aiding to retard the flow of the milk. This cooling-surface is shown at A, and it has secured centrally thereof, inclosing its apex, a strainer, which has flaring walls, as shown at B. This strainer acts as a receiver for the milk which is poured therein. Arranged concentrically with the strainer is a rim or flange projecting from the surface of the part A, and while I have shown but one of these rims, as at $b$, I desire it to be understood that I may use as many as may be found desirable, the number depending largely upon the size of the cooling-surface and the amount of milk which is to be cooled. It will be seen that as the milk is poured into the strainer it passes through the openings in the walls thereof, being perfectly strained, and flows down upon all sides over the inclined surface, its flow being retarded by the rim. This rim dams the milk and causes it to flow over the edge in a thin sheet, which exposes it to the cooling action of the air, and the milk then again flows over the surface of the side of the rim to the can, or over the other rims, if more than one be used. The flow of the milk is thus retarded and cooled by its long exposure to the air and by reason of its flow in thin sheets over the inclined surface and the rim or rims.

By extending the brackets upwardly and outwardly from the edge of the cooling-plate said plate will be supported with its edge below the can-rim and within the mouth of the can.

I claim as my invention—

In combination, a cooling-plate A, having a funnel and a ring $b$, attached thereto, said plate having brackets extending upwardly and outwardly from its edge, whereby said plate will be supported within the mouth of the can and below the rim thereof, with a space between its edge and the can-side, substantially as described.

In testimony whereof I have signed my name to this specification in the presence of two subscribing witnesses.

PATRICK S. RYAN.

Witnesses:
CHARLES H. JOYCE,
C. W. MUSSEY.